July 9, 1968 — L. W. CURTIS — 3,391,883
GORE TAILORING
Filed April 19, 1965
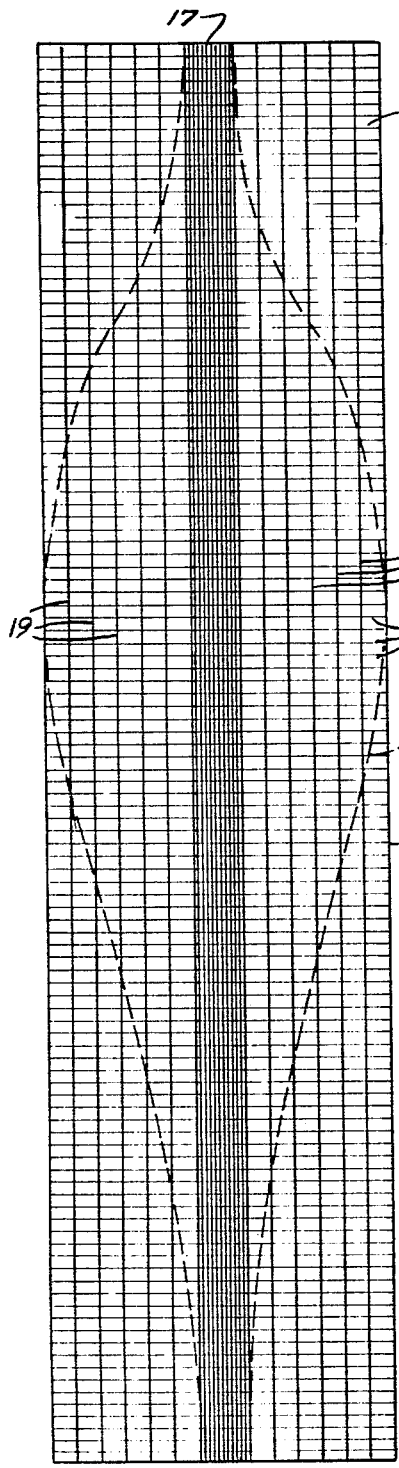
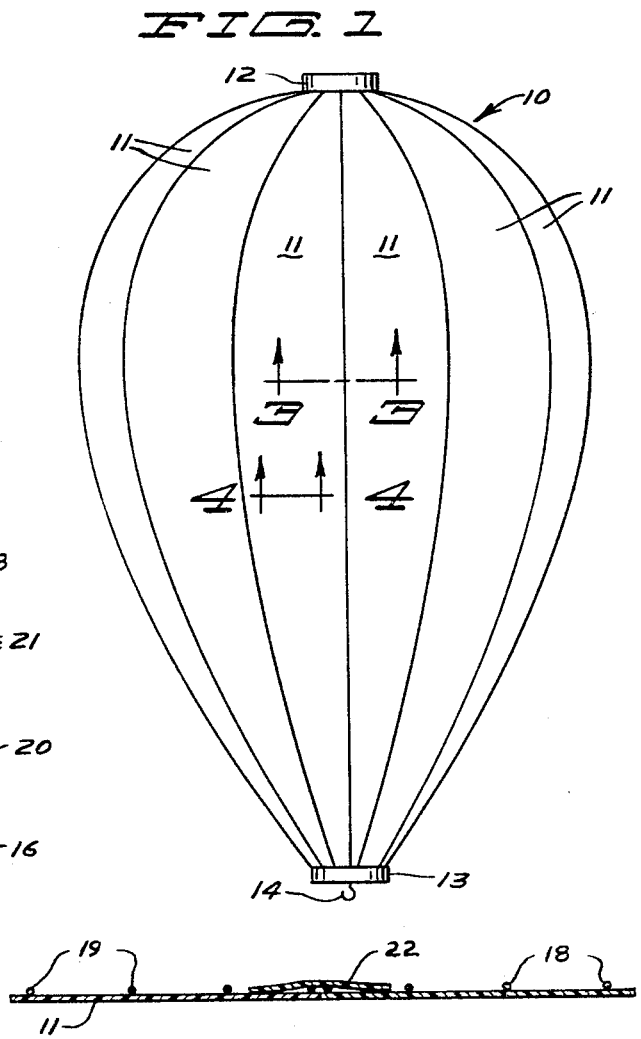
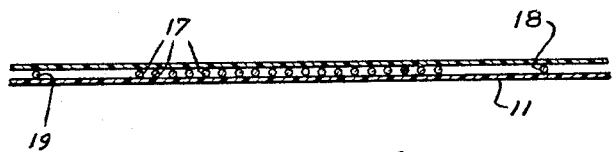
INVENTOR.
LLOYD W. CURTIS
BY Meyers & Peterson
ATTORNEYS

United States Patent Office 3,391,883
Patented July 9, 1968

3,391,883
GORE TAILORING
Lloyd W. Curtis, Northfield, Minn., assignor to G. T. Schjeldahl Company, Northfield, Minn., a corporation of Minnesota
Filed Apr. 19, 1965, Ser. No. 448,949
6 Claims. (Cl. 244—31)

The present invention relates generally to an improved balloon vehicle of extremely light weight which is capable of ascending to high altitudes and capable of supporting heavy loads during a flight. The improved balloon vehicle of the present invention is provided with reinforcing which is specifically tailored to efficiently and equally distribute the load across the area of the balloon surface without introducing or placing any added weight, burden or load in the balloon vehicle structure which does not contribute to load carrying capability.

Balloon vehicles are useful in the conducting of many scientific experiments. Many worthwhile experiments either do not require an orbiting vehicle, or are not capable of being so conducted because of the acceleration and rapid motion inherent in rocket propulsion. Many experiments in the field of astronomy are best performed utilizing a balloon vehicle. One major drawback of the balloon vehicle in the field of scientific experiments has been its lack of load carrying capacity and its general unreliability. As a result, many important and costly experimental programs have been curtailed because of repeated balloon failure. The problems of poor reliability and low load carrying capacity have limited the applicability of balloon vehicles to certain scientific experiments particularly high altitude experiments. When heavy payloads are being considered, it has been the practice in the past to add load bearing tapes, lines or members to the balloon envelope structure in order to enhance its load carrying capabilities. Unfortunately, as the reinforcement material is added, the overall weight of the vehicle per-se is increased, this detracting from the load carrying capacity.

Recently, the availability of a light weight scrim prepared from woven polyester fibers of polyethylene terephthalate, such as Dacron, has made it possible to develop heavy load balloons of exceptionally light weight. The envelope material is preferably of high strength, such as for example stress oriented film prepared from polyethylene terephthalate, available under the trade name of Mylar. Prior to the advent of the scrim materials for balloon vehicles, load tapes attached to the balloon wall were generally provided for assisting in supporting the load. One major drawback of load tapes is that they fail to distribute the load evenly when the balloon is not fully deployed. The scrim reinforced balloon provides uniform strength throughout the balloon and the load supporting strength is not concentrated on the few load tapes which may be maintained under tension. Scrim reinforced materials are also advantageous in that they provide tear stopping capabilities which eliminate catastrophic ruptures or failures. The material is flexible at extremely low temperatures encountered at stratospheric atmospheres.

When load tapes are utilized, there is theoretically no stress across the balloon gores. No transverse reinforcement is therefore necessary and longitudinal threads alone should be ample. However, the absence of a transverse stress only occurs when the balloon is completely inflated, floating at its predetermined altitude. During the processes of inflation and ascent, while the balloon is deploying its fabric, stresses can and do occur in the circumferential direction across the gore surface. It has been found that weight and money can be saved by tailoring the gore material to the actual stress distributions by specifically tailoring the disposition of the threads as required for the individual balloon application. In order to provide the greatest strength at a practical minimum weight, a woven scrim pattern has been found to be preferable.

In this woven pattern, the weft or fill pattern which is disposed transversely across the gores may be at a substantially uniform density. However, for certain balloons, it is desirable to increase the density of this pattern on the upper portions of the balloon where the load carrying stresses are greater. In the warp pattern, the line density or thread density is tailored. The density is effectively greater at the longitudinal axis or center of the gore, and decreases toward the lateral edges thereof. Stated another way, the center portion of the gore has a thread density which is greater than the density at or along areas adjacent the lateral edges of the gore. Substantial strength is available for a balloon fabricated from, for example, one-quarter mil thick film of stress oriented polyethylene terephthalate, such as is commercially available under the trade name of Mylar, and reinforced with woven polyethylene terephthalate fibers, commercially available under the trade name of Dacron, and secured to the surface of the film with an adhesive or flocking agent. By tailoring the reinforcing material, it is possible to place the reinforcing material at the point where it is needed, thereby eliminating the introduction of a substantial quantity of unnecessary weight. It will be appreciated that one of the heaviest components of the balloon is the reinforcing thread or scrim, and therefore by reducing the number of threads in the balloon by placement where they belong, a weight reduction of substantial percent can be achieved without risking a sacrifice in overall strength.

The balloon designed in accordance with the teachings of the present invention provides an infinite number of possibilities for load bearing capability by placing the strength at a point where it is needed. This feature provides optimum material design for the balloon designer. A light-weight balloon is thereby provided with homogeneous distribution of the load across the surfaces thereof.

The scrim reinforcement material is preferably bonded to the film of the envelope by means of an adhesive or the like, however, it will be appreciated that this scrim may be heat laminated to the film as well. The scrim may be disposed on one or both major surfaces of the film. As a further alternative, the scrim may be enclosed between a pair of laminated films, if desired. The fibers may be arranged in a basketweave, such as an over and under weave, a lenoweave or may be merely laid on the surface of the film.

Therefore, it is an object of the present invention to specifically tailor gore configurations so as to secure a maximum utilization of material strength consistent with a minimum weight.

It is still a further object of the present invention to tailor the longitudinal or warp fibers to the maximum utilization of these fibers along the length of the gore.

It is yet a further object of the present invention to provide a substantial density of reinforcing scrim in the center portion of the gore, and a reduced density of these fibers along the lateral edges of the gore, thereby providing a substantial number of fibers along the longitudinal end portions of the gore which extend the entire axial length of the gore.

Other and further objects of the present invention will become apparent to those skilled in the art upon a study of the following specification, appended claims and accompanying drawing wherein:

FIGURE 1 is an elevational view of a balloon structure prepared from a plurality of individual gores, the gores being bonded or secured, one to the other, along mutually adjacent lateral edge surfaces;

FIGURE 2 is a top plan view of a gore arranged rectangular film base, the longitudinal or warp fibers of the reinforcement being tailored in accordance with the present invention;

FIGURE 3 is a sectional view taken through the transverse thickness of a pair of gores bonded or secured together along the lateral edges thereof, the view being taken along the line and in the direction of the arrows 3—3 of FIGURE 1; and FIGURE 4 is a view similar to FIGURE 3 and taken along the line and in the direction of the arrows 4—4 of FIGURE 1, and showing a modified material.

In accordance with the preferred modification of the present invention, the balloon structure generally designated 10 in FIGURE 1 comprises a plurality of individual gore elements 11—11, each of the gores being bonded or secured together along the mutually adjacent lateral edges thereof. The balloon structure 10 includes a top cap 12 which is utilized to bond the individual gores together at one longitudinal end thereof, this being along the top portion of the balloon structure. The balloon 10 further includes a load ring 13 which is secured to the base or opposite longitudinal end of the gore structure, this ring being mechanically firmly secured to each of the gores. Load rings for balloons are available commercially, and lacking a specific load suspending problem, there is no unusual design required. It is a feature of these commercially available load rings that each of the gores forming the balloon is firmly secured to the ring in order that no unusual or anomalous load distributing will occur. The load ring 13 is provided with a hook member 14 to which the pay-load may be attached.

Attention is now directed to FIGURE 2 of the drawings wherein a gore, having a reinforcing scrim secured to the surface thereof in the pattern of the novel aspects of the present invention, is illustrated. This gore 20 is shown outlined in phantom in the rectangular form as at 16, and includes a plurality of longitudinal or warp fibers. The center group of these fibers is designated 17, this group being flanked by lateral edge fiber grouping 18 and 19. It will be observed that the longitudinal or warp fibers are at a relatively high density in the center portion of the gore as at 17, and are at a substantially decreased density along the lateral extent of the gore as at 18 and 19. In one specific structure, utilizing 0.00015 inch thick Mylar film, to which has been adhesively bonded a plurality of Dacron scrim fibers, a 5 million cubic foot balloon having a gore structure such as is shown in FIGURE 2, utilizing 175 gores and capable of carrying a pay-load of 350 pounds to an altitude of 140,000 feet utilized the following pattern: The center portion had a thread density of 5 threads per inch, and the lateral edge portions had a thread density of 1 thread per 4 inches of lateral extent. The gore which comprised 0.50 mil stress oriented polyethylene terephthalate (Mylar) was 365 feet in length, and had a maximum width of 56 inches. The center 10 inches had the high density of fibers and the remaining portions had the low density fiber reinforcement. The horizontal component, that is, the threads in the lateral or weft direction, and had a thread density of 3 per inch, these reinforcing fibers running at an angle of 80 degrees to the axis of the gore. In order to bond the fibers to the film material the fibers being 220 denier roto set high tenacity Dacon, 22,000 yards of which weigh 1 pound, an adhesive such as that certain polyester adhesive sold commercially by the G. T. Schjeldahl Company of Northfield, Minn. under the code name of GT 301 has been found to be useful. This adhesive is applied as a thin layer to the surface of the film. Of course, if desired, certain other flocking agents may be used.

Attention is now directed to FIGURE 3 of the drawing wherein the bond between the lateral edges of the adjacent gores is shown. In this connection, the bond is prepared from a thermally sensitive tape 22 which is adhesively secured or bonded to the lateral edges of the individual gores. These tapes are commercially available from the G. T. Schjeldahl Company of Northfield, Minn. under the code name GT201. The gap between the individual gores is adjacent the axis of the tape 22 and is visible in the drawing. It will be observed that the density of longitudinal or warp threads 18—18 and 19—19 is minimal along the lateral edge surface areas of the individual gore members 11—11.

FIGURE 4 illustrates a modified gore with a pair of film members. Furthermore, it is taken on a different lateral area of the balloon gore structure. In this regard, the individual longitudinal or warp fibers 17—17 are at a substantially greater density in the center area than those fibers 18—18 and 19—19 in the lateral areas.

It will be appreciated that the horizontal or weft fibers which are arranged substantially transverse to the longitudinal axis of the gore may be arranged at 90 degrees to that axis or, as an alternative, depending upon fiber laying techniques, may be at an angle other than normal to this longitudinal axis. For example, as indicated previously, it has been found that these fibers may extend at an angle of, for example, 50 degrees to the axis of the gore.

While it has been indicated that stress oriented polyethylene terephthalate is the desirable material for this structure, it has been found that other fiber reinforced film materials may be used as well, such as polyethylene, polypropylene, and the like. It will be appreciated that the plastic film portion of the envelope provides the gas barrier, while the scrim portion of the envelope provides the requisite strength.

It may be readily appreciated that balloons fabricated from a gore arrangement such as disclosed herein may be utilized for light weight, high altitude balloons capable of carrying a substantial load. For example, a balloon having an inflated volume of 1.6 million cubic feet may utilize a gore length of 225 feet, with the number of gores required being 110. Each of the gores will be fabricated as indicated hereinabove.

The number of longitudinal reinforcing scrim fibers on the gore surface will be substantially uniform from one longitudinal end to the other with only a limited number being disposed in the area which does not reach from one end termination to the other.

It will, of course, be understood that various changes may be made in the form, details, arrangements and proportions of the parts without departing from the scope of my invention as set forth in the appended claims.

What is claimed:

1. In a balloon comprising a plurality of gores, each having a longitudinal axis extending from one end thereof to the other and being secured together one to another along a line adjacent the lateral edges thereof to define an enclosure structure, each of said gores having a plurality of discrete reinforcing fibers bonded to a surface thereof at spaced points therealong and including a plurality of fill fibers and a plurality of warp fibers, said warp fibers extending generally parallel to the longitudinal axis of said gore and being disposed between the lateral edges and across generally the entire transverse dimension of each of said gores, said warp fibers being bonded to the surface of said gore substantially continuously along the extent of the length thereof, the number of said warp fibers secured to said surface at spaced points between said lateral edges being substantially constant along the extent of said longitudinal axis.

2. The balloon enclosure structure as defined in claim 1 being particularly characterized in that a tape means is provided for bonding the mutually adjacent lateral edge surfaces of each of the gores together.

3. The balloon structure as defined in claim 1 being particularly characterized in that said fill fibers are disposed in a more highly dense pattern at points along the upper hemisphere than along the lower hemisphere.

4. The balloon envelope as defined in claim 2 being particularly characterized in that said tape means consists of a pair of tapes secured to opposite surfaces of said gores along the lateral edge surfaces thereof.

5. In a balloon comprising a plurality of gores, each having a longitudinal axis extending from one end thereof to the other and being secured together on to another along a line adjacent the lateral edges thereof to define an enclosure structure, said enclosure structure having the form of a prolate spheroid, each of the gores having a major axis and a minor axis, and having a plurality of discrete reinforcing fibers bonded to a surface thereof at spaced points therealong and including a plurality of fill fibers and a plurality of warp fibers, said warp fibers extending generally parallel to the longitudinal axis of said gore and being disposed between the lateral edges and across generally the entire transverse dimension of each of said gores along the entire extent of said major axis, said warp fibers being bonded to the surface of said gore substantially continuously along the extent of the length thereof, the number of said warp fibers secured to said surface at spaced points between the lateral edges being substantially constant along the extent of said longitudinal axis with the said warp fibers being disposed in a pattern which becomes more dense as one moves from the center of said axis toward the ends thereof.

6. The balloon enclosure structure as defined in claim 5 being particularly characterized in that the warp fiber density is greatest at points adjacent the ends of the longitudinal axes, and is substantially less at a point which is substantially midway between the ends of said longitudinal axis.

References Cited

UNITED STATES PATENTS

| | | | |
|---|---|---|---|
| 2,756,948 | 7/1956 | Winzen et al. | 244—31 |
| 2,767,940 | 10/1956 | Melton | 244—31 |

FERGUS S. MIDDLETON, *Primary Examiner.*

MILTON BUCHLER, *Examiner.*

T. MAJOR, *Assistant Examiner.*